United States Patent Office 3,319,364
Patented May 16, 1967

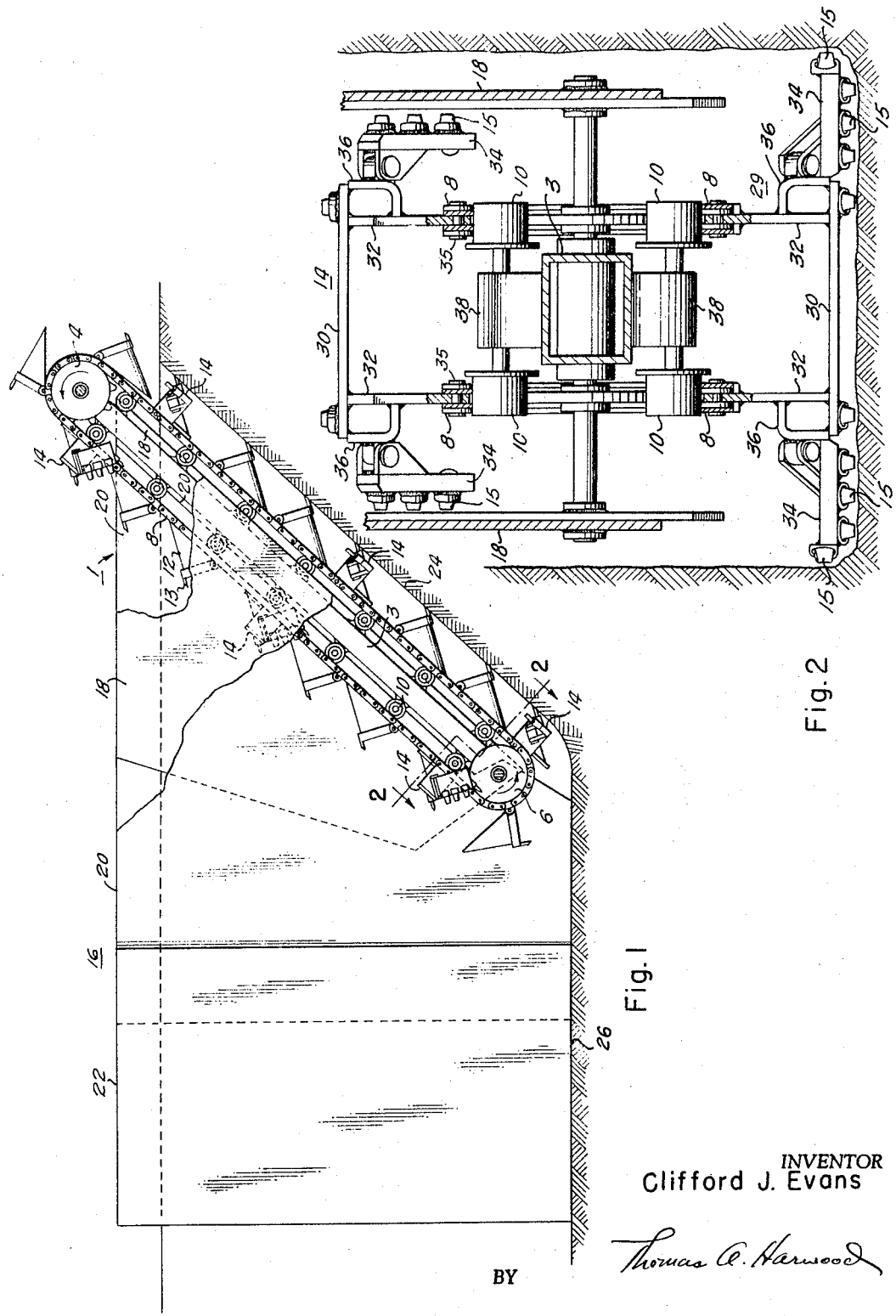

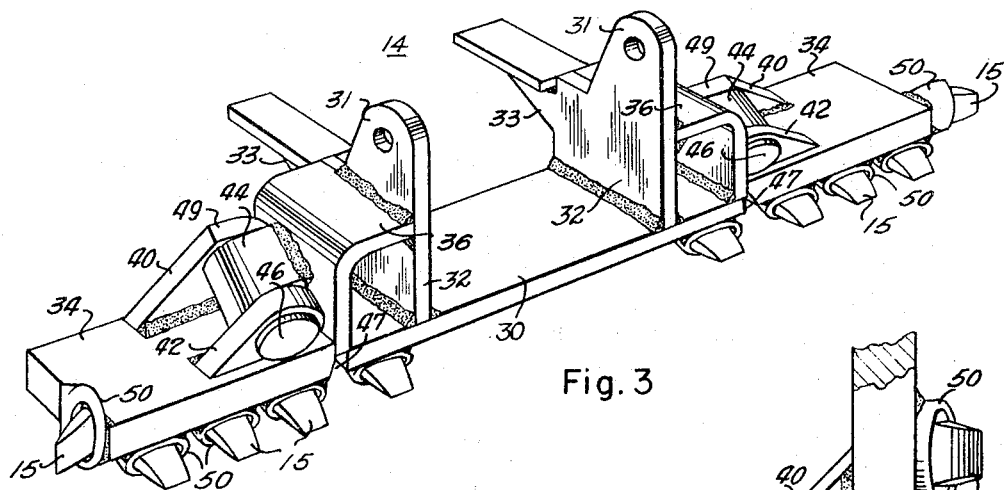
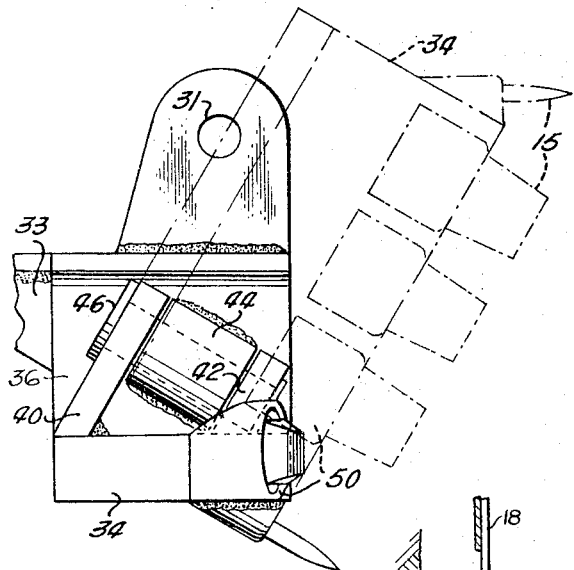
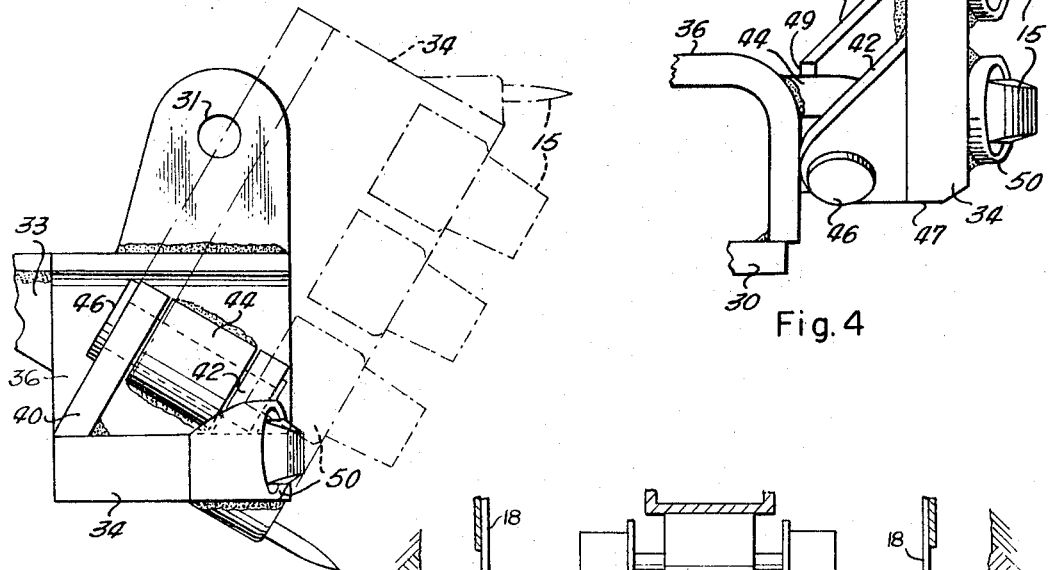
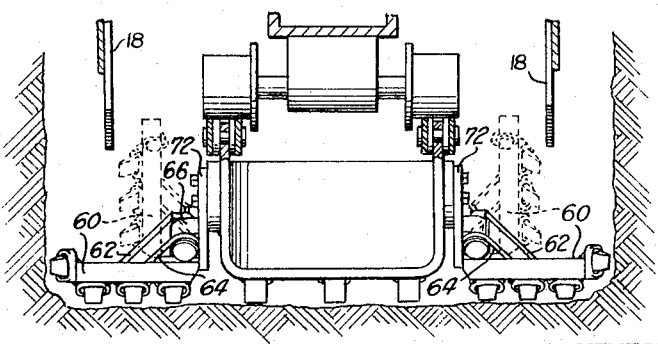

3,319,364
TRENCHING MACHINE SIDE CUTTING
ATTACHMENT
Clifford J. Evans, Dallas, Tex., assignor to Jetco, Inc.,
Alhambra, Calif., a corporation of California
Filed Nov. 7, 1963, Ser. No. 322,204
4 Claims. (Cl. 37—86)

The present invention relates generally to a trench side cutting attachment for use with a trenching machine. More particularly, it relates to such an attachment for use with a trench cutting machine equipped with trench wall supporting shields which are moved inside the trench as it is cut to provide protection from cave-ins for workers inside the trench, and in which the side cutting attachment is provided to facilitate the movement of the shield in the trench.

Trenching machines for laying pipe are often equipped with trench wall supporting shields which are moved along inside the trench as it is being cut to prevent the walls of the trench from caving in. The shields not only facilitate the cutting of the trench, but provide a safety measure which allows workmen to enter the trench and lay pipe during the cutting thereof without danger of physical injury from cave-ins. Trench cutters used for this purpose are normally of the ladder type in which an endless bucket chain carried on a boom is used to cut the trench. The bucket chain passes between the opposing trench wall supporting shields and cuts a trench width slightly narrower than the overall outside width of the opposing shields. It is thus apparent that some means must be provided to cut the trench wider than that cut by the bucket chain to enable the shields to freely pass through the trench. The additional cutting action has been attempted in the past by the provision of a blade on the leading edge of the shields, whereby the shields provide their own side cutting action. This, obviously, has disadvantages where the trench is being cut in hard terrain in which the shields are unable to provide an efficient cutting action, if any at all. In fact, experience has shown that in terrain of this nature, it is often necessary to remove the shields entirely from the trench cutting machine to facilitate any trench cutting action at all. Because of the tremendous weight and size of the normal trench wall supporting shields, the process of removing the shields and then reattaching them has proved to be extremely costly.

Although other attempts have been made to provide a solution to this problem, there had not been devised, prior to the present invention, any cutting means to widen the trench for this purpose which is either effective or reliable. The present invention provides a side cutting attachment that can be installed on the bucket chain of a conventional trench cutting machine and is adapted to widen the trench beyond that cut by the buckets by an amount sufficient for the shields to freely pass through the trench. The side cutting attachment of the invention is so designed that as it enters into the trench on its downward pass with the moving bucket chain, it has a width less than the inside width between the shields and passes therebetween, and on its upward travel, passes out in front of the shields and opens laterally wider than the shields to provide a side cutting action. The attachment is effective to widen the trench sufficiently for the shields to freely move therethrough. Because of the simplicity of design of the side cutting attachment of the invention, as will be described hereinafter, it can provide cutting action in all types of terrain with extreme reliability, and cannot be jammed or gummed-up regardless of the nature of the terrain, whether hard or of clay-like consistency. Moreover, the side cutting attachment can easily be attached to any conventional trench cutting machine at very little cost and without any substantial revision of the machine itself. As will be seen hereinafter, the preferred embodiment of the invention comprises a separate side cutter to be attached to the bucket chain of a conventional trenching machine. In an alternate embodiment, attachments are provided to a conventional digging bucket to provide the side cutting action, all as will be explained hereinafter.

Other objects, features and advantages will become apparent from the following detailed description of the invention when taken in conjunction with the appended claims and the attached drawing in which like reference numerals refer to like parts throughout the several figures, and in which:

FIGURE 1 is a side elevational view, partly cut away, of a bucket chain and trench wall supporting shields of a conventional trenching machine employing the side cutting attachment of the invention;

FIGURE 2 is a sectional view taken across lines 2—2 of FIGURE 1 showing the side cutting attachment in a folded position as it moves between the shields on its downward pass and in its open or folded-out position as it clears the shields and moves on its upward pass to provide a side cutting action;

FIGURE 3 is a perspective view of a preferred embodiment of the side cutting attachment in its folded-out position;

FIGURE 4 is a fragmentary view of the side cutting attachment of FIGURE 3 showing one of the cutting arms in the folded position;

FIGURE 5 is an end view of the side cutter of FIGURE 3 illustrating the folded-out arm position in solid lines and the folded arm position in dashed lines; and FIGURE 6 is a sectional view of a bucket chain and trench wall supporting shields similar to that shown in FIGURE 2 in which pivotal side cutting arms are attached to a conventional cutting bucket.

Referring now to FIGURE 1, there is shown a ladder-type endless bucket chain, designated generally at 1, for cutting a trench and which is used on conventional trenching machines, and trench wall supporting shields attached thereto and designated generally at 16. The far supporting shields are shown in elevation with all of the near supporting shields cut-away with the exception of a small portion, so that the bucket chain can be clearly seen. The bucket chain consists of metal chains 8 to which are attached conventional cutting buckets 12 having cutting teeth 13 and the side cutter 14 to be described below. An elongated boom 3 carries the bucket chain by means of sprocket wheels 4 and idler wheels 6 rotatably mounted at the extreme ends of the boom and which engage the chains. Additional idler rollers 10 are mounted along the boom at spaced intervals to support the chain along its length. Suitable power means (not shown) is used to turn the sprocket wheels 4 which drives the bucket chain into the trench on the upper side of the boom and out of the trench on the lower side of the boom. Thus the trench is cut by the buckets on their upward pass on the bottom side of the boom, in addition to which the buckets remove the earth cut away thereby.

Attached to the sides of the boom by any conventional or suitable means are trench wall supporting shields 16, such that the bucket chain passes between the parallel front shield sections 18 as shown in cutaway. By way of explanation, the boom and bucket chain of a conventional machine can be rotated upward and downward according to the desired depth of the trench. For cutting deeper trenches, the boom and bucket chain will assume a more vertical position, whereas the opposite is true for cutting shallower trenches. The shields are conventionally comprised of three separate sections 18, 20 and 22 which are normally referred to as the front, middle and back sections, respectively, wherein skids or a floor section is provided on the middle shield to support the weight. The front section 18 is attached to the boom, as above noted, and is fixed in relation therewith, whereas the middle section 20 is pivotally connected to the front section 18 at the axis of the idler wheels 6. The back section 22 is connected to the middle section 20 in non-rotating but telescoping relation therewith. The three shield sections are conventionally moved relative to each other by hydraulic means (not shown). As the trench is cut, the earth removed by the buckets is conveyed by suitable means to the rear of the back shields to fill the trench, which provides a supporting wall against which the back shields may push against. The hydraulic means above noted for moving the shields are used to move the middle section 20 in telescoping relation with the back section 22 so as to carry the trench digging machine forward at a prescribed rate, during which the cutting action is provided. Since the middle section 20 is pivotally connected to the front section 18, the middle and back sections 20 and 22, respectively, will ride along the bottom 26 of the trench regardless of the depth of the trench or the angle which the boom and bucket chain make with the vertical. During the time the trench is being cut, workmen can enter into the trench between the middle and back shield sections and lay pipe, tile or other material.

As will be seen from FIGURE 1, the cutting buckets extend beyond the leading edge of the front shield section 18 during their upward pass to provide the cutting action along the surface 24. According to the preferred embodiment of the invention, side cutters or side cutting attachments 14 are attached to the chains 8 along spaced intervals thereon and provide the necessary cutting action of widen the trench over that which is provided by the digging buckets to enable the shield 16 to pass freely through the trench. To effect this, the side cutter passes between the front shields on its downward pass as do the buckets, but folds out to wider dimensions as it clears the bottom of the front shield section to provide the side cutting action on its upward pass.

Referring now to FIGURE 2, which is a sectional view taken along lines 2—2 of FIGURE 1, the side cutter 14 comprises a pair of vertical supporting members 32 rigidly fixed to transverse bar 30. The supporting members 32 are rigidly attached to the chains 8 in the same manner as the buckets, such as, for example, by bolts or pins designated generally at 35. Angle supports 36 are attached between each end of the transverse bar 30 and the two respective vertical supporting members 32. Cutting arcs 34 are pivotally attached to the two angle supports and are folded downward when the side cutter 14 is above the boom 3 on its downward pass. When the side cutter is below the boom on its upward pass, the arms 34 are folded out in an open position as shown in the bottom of FIGURE 2. That is to say, the arms 34 are pivotally attached to the angle supports 36 by braces at an angle such that the arms fold up as a result of their weight to pass between the front shields 18 on their downward pass. Conversely, as the side cutter clears the bottom of the front shields, as shown in FIGURE 1, the pivotally connected braces are then at an angle to cause the arms to fold out parallel with the lateral bar 30, which movement is again effected by the weight of the arms. As can be seen from FIGURE 2, the chains 8 ride on the idler rollers 10 which are supported for rotation on the boom by fixed housings 38. The arms 34 are provided with cutting teeth 15 which are similar or the same type as the cutting teeth of a conventional cutting bucket, so that the trench is widened beyond the width of the shields. Sufficient cutting teeth 15 are provided on the cutting arms 34 to cut an approximately square trench, if desired, with additional teeth being provided on the transverse bar 30 to increase the cutting action. In actual practice the cutting teeth on the successive side cutters and the cutting buckets are staggered so as to effect a smooth overall trench.

A pictorial view of the preferred embodiment of the side cutter 14 is shown in FIGURE 3 and comprises a pair of vertical supporting members 32 rigidly attached to a transverse bar 30. The vertical supporting members each comprise ear portions 31 for being inserted between the chain links and attached thereto, and rearwardly extending members 33 for resting on the chains. Angle supports 36 are welded between the sides of the vertical members 32 and the ends of the transverse bar 30. The angle supports 36 on each side of the cutter support the respective cutting arms 34, which are attached thereto by means of braces 40 and 42 through a pivot joint 44, the latter which includes a rod or axle 46 passing through the pivot joint so that the braces may rotate thereabout.

FIGURE 3 shows the side cutting arms in their folded out or opened condition, whereas FIGURE 4 is a partial view of the side cutter showing one arm in a folded or closed condition. In the opened condition, the arms 34 rest against the angle supports at location 47, and in the closed condition, the arm makes an angle of about 90° to the lateral member 30 with brace 40 resting securely against the angle support 36 along a flat surface 49.

Teeth pockets 50 of the conventional type are welded to the arms along the leading edges and ends thereof, within which cutting teeth 15 of the conventional type are welded to provide the cutting action. The view of FIGURE 3 is shown facing the cutter as it travels toward the viewer on its upward pass. Thus, the teeth along the length of the arms face forward and slightly downward, whereas the teeth at the ends face outward and slightly downward.

As shown in FIGURE 5, which is an end view of the side cutter, the pivot joint and braces supporting the arms are attached to the arm 34 and angle support 36 at a slopping angle with respect to the vertical. The solid lines of the figure represent the arms in the folded out position, and the dashed lines show the arms as folded up. It can be seen that in the folded out or open condition, the arm 34 is aligned with the lateral bar 30, but in its folded or closed condition, the arm 34 makes an angle with the vertical. The preferred angle is about 30°, as shown. Thus the cutter, during its downward pass on the track rails, is oriented such that the axis of the pivot joint is approximately horizontal, which gives a maximum tendency for the arms to fold up by virtue of their weight. Conversely, during the upward pass, the axis of the pivot joint is again approximately horizontal, but the arms have been inverted to provide a maximum tendency for the arms to open out. In both cases, components of the weights of the arms are directed vertically downward. The force created on the arms of the cutter as a result of a cutting into the earth on its upward pass is approximately parallel to the axis of the pivot joint, thus creating no tendency for the arms to fold up or collapse.

An alternate embodiment of the invention is shown in FIGURE 6, wherein side cutting arms 60 are attached to the opposite sides of a conventional cutting bucket 70 by means of braces 62 and 64 connected to a pivot joint 66. In other words, this particular embodiment utilizes only the folding cutting arms which are the same as described with reference to the previous figures and which are carried or supported directly by the conventional digging bucket. Any suitable means can be used to mount the pivot joint to the bucket for supporting the arms, such as bolts or other suitable fasteners 72. The arms are shown in solid lines in their unfolded position, and in dashed lines in their folded positions, wherein it is to be understood that the folded position occurs only when the bucket is on the top side of the track rails and boom on its downward pass.

The side cutter is preferably comprised to steel and can be of any dimensions suitable to fit the track rails of a conventional trenching machine. The cutting arms can likewise be any length to accommodate wider or narrower cutting action, as desired. It has been found that broadening the trench width by about 6 inches on each side of the shields is adequate for allowing the shields to freely pass through the trench. As many side cutters as needed can be attached to the track rails between the cutting buckets at intervals therealong. Where only side cutting arms are used as in the second embodiment of FIGURE 6, either some or all of the buckets are provided with the side cutting arms.

Although the invention has been described with reference to specific embodiments thereof, other modifications and substitutions that do not depart from the true scope of the invention will become apparent to those skilled in the art, and it is intended that the invention be limited only as defined in the appended claims.

What is claimed is:

1. A side cutter for being attached to the bucket chain of a trenching machine and driven generally downward into the trench on the top side of said bucket chain and generally upward out of said trench on the bottom side of said bucket chain and adapted to widen said trench by cutting into the sides thereof when driven upward, comprising:
   (a) a main support for being attached to said bucket chain generally laterally thereacross, and
   (b) first and second cutting arms for cutting into the sides of said trench laterally beyond said bucket chain pivotally attached to opposite sides, respectively, of said main support adjacent the lateral edges of said bucket chain,
   (c) said first and said second cutting arms being attached to said main support for pivotal movement about axes making angles to the plane of said bucket chain so as to establish vertical components of the weights of said first and said second arms perpendicular to said axes when said side cutter is driven both downward into and upward out of said trench to cause said first and said second arms to assume folded positions adjacent said bucket chain when driven downward into said trench and to assume open positions extending beyond said bucket chain when driven upward out of said trench.

2. A side cutter as set forth in claim 1 wherein the angle to which each of said first and said second cutting arms is attached to said main support is about 30° to said plane of said bucket chain.

3. A side cutter as set forth in claim 1 wherein said first and said second cutting arms include cutting teeth on the leading edges thereof.

4. A side cutter as set forth in claim 1 wherein said main support comprises a cutting bucket.

References Cited by the Examiner

UNITED STATES PATENTS

| | | | |
|---|---|---|---|
| 528,433 | 10/1894 | Hyatt | 37—69 |
| 1,329,523 | 2/1920 | Hanson | 37—86 |
| 1,343,081 | 6/1920 | Hammen | 37—86 |

ABRAHAM G. STONE, *Primary Examiner.*

WILLIAM A. SMITH III, *Examiner.*